United States Patent Office 3,465,341
Patented Sept. 2, 1969

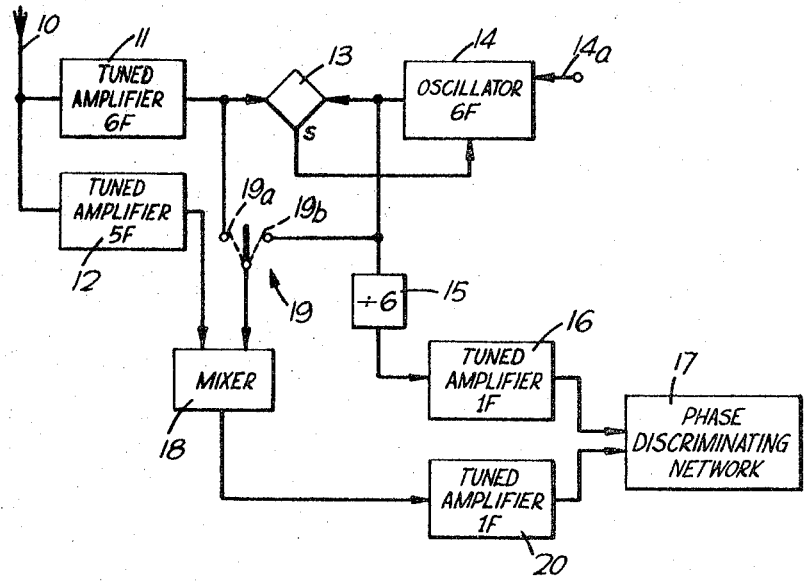

3,465,341
RECEIVERS FOR PHASE COMPARISON RADIO NAVIGATION SYSTEMS
Donald Edward Bridges, London, England, assignor to Decca Limited, London, England, a British company
Filed Oct. 17, 1968, Ser. No. 768,300
Claims priority, application Great Britain, Dec. 4, 1967, 55,110/67
Int. Cl. G01s 1/30
U.S. Cl. 343—105                     14 Claims

ABSTRACT OF THE DISCLOSURE

A simplified receiver for a continuous wave radio navigation system of the Decca Navigator type. The receiver makes use of two amplifiers tuned to frequencies 5F and 6F, namely only two of the four frequencies normally radiated by a chain of stations in a Decca Navigator system. A switch couples the 6F output signal of a phase locked oscillator or a received 6F to a mixer which derives from a 5F and the selected 6F signal a 1F signal which is compared with 1F signal obtained by dividing the oscillator's output by 6. A phase comparison between the various 1F signals yields phase angles denoting hyperbolae of position relating to an effective comparison frequency of 1F or 5F and thereby provides an accurate position fix.

FIELD OF THE INVENTION

This invention relates to receivers for phase comparison radio navitation systems.

BACKGROUND OF THE INVENTION

In many parts of the world, transmitting stations for phase comparison radio navigation system known as the "Decca Navigator" system are operating to provide phase locked radio frequency signals which can be compared in phase in a receiver to give a position fix. At the present time, the practice is to provide at least three and preferably four transmitting stations in each chain of stations, the signals from which can be cooperatively utilised in the receiver. The transmitting stations radiate signals of different frequencies in a cyclic time sequence. For the most usual type of chain of stations, the four stations of the chain (known as the master station and the red, green and purple slave stations) each radiate for the greater part of the time a single frequency signal, the frequencies of the master, red, green and purple stations being respectively the sixth, eighth, ninth and fifth harmonics of a common fundamental frequency which is about 14 kHz. Periodically, for a fraction of a second, the "normal" transmissions are interrupted and all four frequencies are radiated from the master station with no signal from the other stations. About 2½ seconds later the normal transmissions are again interrupted for a fraction of a second and all four frequencies are radiated from the red slave station with no signal from any other station. About 2½ seconds after this, all four frequencies are radiated from the green slave with no signal from the other stations and finally in the sequence after another 2½ seconds all four frequencies are radiated from the purple slave station with no signal from any other station. There is then a much longer period of normal transmission, the complete cycle being repeated every 20 seconds. The normal transmissions of a single frequency from each station enable accurate position fixing to be effected by phase comparison of the signals in pairs, the frequencies of the two signals of each pair to be compared being brought to a common comparison frequency as is described (for example) in British patent specification No. 620,479. Any given phase relationship between the signals from two stations corresponds to a hyperbolic position line which is one of a set of confocal hyperbolae having these two stations at the foci. The stations are spaced apart distances corresponding to many wavelengths at these comparison frequencies and thus any given phase angle determined at a mobile receiver by comparing the phase of signals from two stations corresponds to one of a number of hyperbolic position lines, each differing by an integral number of complete cycles of phase change at the respective comparison frequency. The multiple frequency transmissions from each station in turn, as is described in the disclosures of British patent specifications Nos. 765,573, 949,480 and 983,014, enable postion lines to be determined with respect to much coarser patterns of hyperbolic lines. This enables ambiguities in the previously described comparisons to be resolved and the position of the receiver to be fixed unambiguously (within a very large area). The received signals can be used to drive a chart position indicating apparatus which automatically computes the position fix and drives by a servo mechanism an index with respect to a chart so as to indicate the chart position of the mobile receiver. Typical chart displays for this purpose are described in the British patent specifications Nos. 665,135 and 983,015.

Alternatively the phase angle determinations can be used to drive integrating phase angle motors which count the "lanes" between sucessive hyperbolic position lines traversed by the receiver and which can be used in conjunction with a chart which is specially prepared and marked accordingly, so that by reference to two numbered lanes a position fix can be obtained. However, in general, the obtaining of a position fix is relatively simple once the phase relationships between the received signals are known and consequently the use of he phase relationships to obtain a position fix will not be described in detail.

The main object of the present invention is directed to a receiving apparatus which can utilise transmissions of the kind described or similar transmissions for position fixing in a relatively simple and economic manner.

BRIEF SUMMARY OF THE INVENTION

A receiver according to the invention essentially comprises two receiving channels tuned to the frequencies $nF$ and $mF$ respectively where $n$ and $m$ are integers differing by unity and have the same ratio as two of the frequencies normally radiated by the stations, an oscillator arranged to produce an output signal frequency of $nF$, means for locking the phase of the oscillator's signal to a signal normally appearing at the output of the channel tuned to the frequency $nF$, such that the phase of the oscillator signal remains stable during relatively short interruptions of said normally received signal, and means for dividing in frequency the oscillator signal to provide a reference output signal of frequency 1F.

Also provided in the receiver are means for mixing signals at $nF$ and $mF$ to produce an output signal at frequency F. This will be explained in detail later.

The receiver of the present invention, as set forth above, makes use only of signals of or simply derived from two of the harmonically related frequencies. Unlike the types of receiving apparatus described in the aforementioned specifications, it requires only two receiving channels. This is much more economical than providing a number of separate channels tuned to each of the radiated frequencies. With the receiver described immediately above, phase comparisons are always made between two signals at a frequency F, a comparison being made during a period of multifrequency transmission.

The receiver according to the invention works as follows: The receiving channels are arranged to receive two of the four harmonically related frequencies radiated from the stations. Although it is not essential that the outputs of the channels be those frequencies, it will for the present be assumed that there is no frequency changer in either channel, so that the frequencies used within the receiver are those radiated by the stations.

Thus, the oscillator is phase locked during periods of normal transmission to received signals at frequency $nF$. In this way the phase of the oscillator can be preserved during periods of multifrequency transmission and signals at frequency F obtained by dividing down the oscillator's output by $n$ can be used as a reference for phase comparisons made at frequency F using signals obtained during periods of multifrequency transmission. It is normally necessary to "notch" the divider, that is, ensure that the 1F output is phase locked to the 1F signal obtained by mixing the $nF$ and $mF$ signals from the station to whose signal at $nF$ the oscillator is locked. This will be explained in detail later.

One signal always used in a phase comparison is therefore the signal at 1F obtained from dividing down the output signal of the phase locked oscillator and the other signal is obtained either from the mixing of received signals at frequencies $nF$ and $mF$ or the mixing of a received signal at frequency $mF$ and the oscillator output at frequency $nF$. As will be explained in detail hereinafter, this enables, during a period of multifrequency transmission, a phase comparison to be made effectively at frequency $mF$ or 1F depending on whether the oscillator's signal or the received signal at frequency $nF$ is combined with the received signal at $mF$ before comparison with the divided-down oscillator's output. The phase comparison represents a hyperbolic position line having the station normally providing the $nF$ signals and the station providing the multifrequency transmissions at its foci. It will be seen that the dual comparisons at relatively high and low frequencies ($mF$ and 1F) enables a relatively unambiguous, yet fairly accurate position line to be obtained.

Conveniently the master station's signals are adopted as the signals at $nF$ (or the signals from which those signals are derived) to which the oscillator is phase locked. In the usual case therefore the frequencies employed in the receiver are 5F and 6F. The use of the master station's signals to lock the oscillator and provide thereby a stable reference signal is very convenient since it is then possible, by making phase comparisons during "slave station" periods of multifrequency transmission to obtain three respective position lines each having the master station as a common focus, which greatly facilitates position fixing. It is readily possible to identify which slave station or master station is radiating signals by virtue of the relatively long transmission period after the purple station's multiple transmission period.

The combination of the received signals at the harmonically related frequencies $nF$ and $mF$ produces, as is well known, a signal at the fundamental frequency 1F, of which the phase is that of a 1F signal or an $mF$ signal according to whether the received signal or the oscillator signal at frequency $nF$ is selected for combination with the received $mF$ signal. In either case the divided-down output from the oscillator acts as a reference for the phase comparison. Unless precautions are taken, a signal at 1F divided down from a signal at $nF$ might "lock on" to any one of $n$ different equiphase positions in $n$ cycles of the signal at frequency $nF$. It is important, but relatively simple in practice, to ensure that the further 1F signal is correctly phased: the phase of the divider's output can be checked by a phase comparison with the 1F signal derived from the multifrequency transmissions.

BRIEF DESCRIPTION OF THE ACCOMPANYING DRAWING

The single drawing is a schematic block diagram of a receiver, constructed in accord with the invention.

DESCRIPTION OF THE PREFERRED EMBODIMENT

The receiving apparatus has an aerial 10 which feeds received signals to two tuned radio frequency amplifiers 11 and 12. In the present example, the amplifier 11 is tuned to a frequency 6F (the "master" frequency) and the amplifier 12 is tuned to a frequency 5F (the "purple" frequency); F is about 14 kHz. As will be explained hereinafter, the normal frequencies actually radiated from the master and purple slave are $6f$ and $5f$ (where $f$ is different from F) and the received signals are heterodyned to produce signals at 6F and 5F, respectively. For all practical purposes the signals at 6F and 5F can and will in this specification be regarded as signals effectively at the frequencies normally radiated by the master station and the purple slave stations, respectively.

The received signals at 6F are fed to one input of a phase discriminator 13 to the other input of which is fed signals at a like frequency from a 6F oscillator 14 which is phase-locked to the normally received signals at 6F. The phase discriminator 13 is of the well-known kind producing direct outputs whose magnitudes represent the sine and cosine of the phase angle between the signals at its two inputs. The "sine" output is used to control the phase of the oscillator 14 to make the phase difference between the inputs to the discriminator zero. This is a well-known arrangement for locking an oscillator in phase and will not be explained further. The output of the oscillator 14 is fed through a divider 15 which effects a division by six to bring down the frequency of the oscillator's output signal to 1F, the resulting signal being amplified in a tuned amplifier 16 and fed to a discriminating circuit 17.

The signals at 5F received by the tuned amplifier 12 are fed to a first input of a mixer 18. The other input of this mixer is either the received signal at 6F or an output signal at 6F from the oscillator. A switch 19 having respective positions 19a and 19b is provided for this purpose. The output of the mixer 18 is fed to an amplifier 20 which is tuned to the frequency 1F and which feeds another input of the discriminating network 17.

The discriminating network 17 could consist merely of a phase angle indicator responsive to the phase between the output signals from the 1F amplifiers 16 and 20. However, the receiver may be arranged to drive a decometer (or a plurality of decometers via a ganged switch arrangement arranged so that one decometer can be used for each of the "red," "green" and "purple" position line determinations). For this purpose the incoming signals at 1F may be each received separately by two phase discriminators. These discriminators would be similar to the aforementioned discriminator 13. The 1F signal from the divider would be fed to one of the discriminators through 90 degree phase shifter, the "cosine" output of that discriminator and the "sine" output of the other discriminator being used to drive a decometer or a selected decometer in the well-known manner. Since however all the information necessary to obtain a position fix is contained in the various phase angles between the signals of frequency 1F, and the extraction of the information can follow conventional procedures, it need not and will not be described in detail.

The operation of the receiver shown in the drawing will now be described.

During periods of normal transmission, the oscillator 14 is phase locked to the received master signals at 6F Hz.

Before making any determination of position lines it is necessary to ensure that the divider 15 is locked onto the correct one of the six possible phase positions (that is, it is properly "notched"). This may be done during the multifrequency transmission period of the master station by comparing the phase of the 1F signals from the divider with the 1F signal from the mixer 18 when the switch 19 is in position 19a. The combined signal at 1F is in the correct phase relationship with respect to the 6F oscillator signal whereas the 1F signal from the divider may not be. By altering the frequency of the oscillator by a few Hz. (using a suitable control 14a) the "notching" of the divider can be altered until there is zero phase angle between the two signals at frequency 1F that are applied to the discriminating network 17.

To explain the obtaining of phase angle indications at (effectively) frequencies 1F and 5F, it is convenient to adopt the following notation; let:

(a) $F_m$ be the phase angle of the received signal, effectively at frequency 1F, from the master station;

(b) $F_R$ be the phase angle of the received signal, effectively at frequency 1F, from the red slave station ($F_G$ and $F_P$ being the corresponding signals from the green and purple slave stations);

(c) $5F_m$ be the phase angle of the received signal, effectively at frequency 5F, from the master station during the appropriate multifrequency transmission period;

(d) $5F_R$ be the phase angle of the received signal, effectively at frequency 5F, from the red slave during the appropriate multifrequency transmission period, and (e) $6F_R$ be the phase angle of the received signal, effectively at frequency 6F, from the red slave during the appropriate multifrequency transmission period.

During the master stations multifrequency transmission period, the phase comparison is expressed by:

$$(6F_m - 5F_m) - 6F_m/6$$

which is zero (or a multiple of $\pi/3$ if the divider is not properly notched).

During a multifrequency transmission period of the red slave station, two alternative phase measurements can be made. With the switch 19 in position 19a the received sginals, effectively at 6F and 5F, are combined and compared with the divider's output. The corresponding phase measurement is expressed as follows:

$$(6F_m - 5F_R) - 6F_m/6 = 5F_m - 5F_R$$

The right hand side of the above equation defines the phase difference, related to a frequency of 1F, between the red slave station's signals and the master station's signals and defines, coarsely, the required master-red position line. In order to determine this position line with greater accuracy, using an effective comparison frequency of 5F, a phase comparison may again be made during a "red" multifrequency transmission period with the switch in position 19b. The signals combined in the mixer are then the received 5F signal and the oscillators 6F signal. Although the frequency of the resultant signal is 1F, its phase is determined by the 5F signal and the phase comparison can be expressed thus:

$$(6F_m - 5F_R) - 6F_m/6 = 5F_m - 5F_R$$

The right hand side of this equation shows that the phase comparison is effectively between the master and red slave signals at a comparison frequency of 5F. This is the required "fine" comparison.

By making similar pairs of phase measurements using the 5F and 6F signals from the other slave stations during their multifrequency transmission perods all the required position line determinations can be made.

The phase angle measurements can be utilised in a number of ways. If a specially prepared chart is used, decometer readings can be translated into a position fix by reference to the chart. Alternatively a chart display, as described in British patent specification No. 665,135, could be manually operated in accord with the various phase measurements.

The signals normally radiated by the stations are harmonics of a frequency $f$ whereas the phase comparisons in the receiver are made at a frequency F. This arises for the following reason. The various chains of transmitting stations in use at the present time all use a slightly different fundamental frequency $f$. However, to simplify the design of the receivers, received signals are heterodyned to be similar harmonics of a frequency F which is always the same. The receivers can therefore be used with any chain of stations and in order to ensure that the received transmissions are compatible with the receiver the incoming signals at $5f$ and $6f$ are heterodyned using signals at $5d$ and $6d$ where $d$ equals $(F+f)$. It will be appreciated that $d$ is different for each chain of transmitting stations. The heterodyning is not essential if the frequencies $5f$ and $6f$ are used directly in the receiver.

It will therefore be readily apparent to those skilled in the art to which the invention relates that it is fully contemplated by the invention to receive two of the harmonically related frequencies having a difference frequency at the fundamental frequency common to the said transmissions and heterodyne or otherwise change the frequency of those signals (while preserving their phase relationship) by the same factor and then to apply those frequencies each to one of the aforementioned channels.

It will be apparent that the receiver according to the present invention could also be used in association with a chain of transmitting stations in which those frequencies which are not used in or not used to derive signals in the receiver were not radiated by the stations.

Various other possibilities and modifications will present themselves to those skilled in the art and accordingly the above description is intended to illustrate rather than restrict the invention claimed in the claims that follow.

I claim:

1. A simplified receiver for a phase comparison continuous wave radio navigation system, essentially comprising the combination of:
    (a) first and second receiving channels only, said channels being tuned to the frequencies $nF$ and $mF$ respectively, $n$ and $m$ being integers differing by unity;
    (b) signal generating means providing at an output an oscillatory signal at frequency $nF$;
    (c) divider means having an input coupled to the output of the oscillator and an output, the divider means being constructed to divide the frequency of a signal at its input by $n$;
    (d) phase discriminating means having first and second inputs, the said first input being coupled to the output of the divider;
    (e) mixer means having first and second inputs, said first input of the mixer means being coupled to the output of said second receiving channel;
    (f) phase locking means coupling said oscillator in stable phase locked relation to the output of said first channel; and
    (g) switch means for selectively coupling the output of the signal generating means and the output of the first receiving channel to the second input of the mixer means.

2. The combination set forth in claim 1 further comprising an amplifier tuned to the frequency F connected between the output of the divider and the first input of the phase discriminating means and an amplifier tuned to the frequency F connected between the output of the mixer means and the second input of the phase discriminator means.

3. The combination as set forth in claim 2 in which $n$ is 6 and $m$ is 5.

4. The combination set forth in claim 1 further comprising control means for controlling the phase of the divider means.

5. The combination set forth in claim 4 further comprising control means for slightly altering the frequency of the signal generating means whereby to ensure that the divider is properly notched.

6. A receiver for a phase comparison continuous wave radio navigation system, comprising:
    (a) first and second tuned amplifiers tuned to the frequencies $n$F and $m$F respectively where $n$ and $m$ are integers differing by unity;

(b) signal reception means coupled to feed said amplifiers;

(c) an oscillator having two outputs and a phase control input, said oscillator being tuned to the frequency $n$F;

(d) divider means having an input and an output, the divider means being constructed to divide by $n$ the frequency of a signal appearing at its input;

(e) first phase discriminating means having a first input coupled to the output of the divider means and also having a second input;

(f) mixer means having first and second inputs, the first input of the mixer means being coupled in signal receiving relation to the said second receiving channel;

(g) second phase discriminating means having a phase control output means coupled to the said phase control input of the oscillator, said second phase discriminating means being coupled in signal receiving relation to said first tuned amplifier and one of the said oscillator's outputs;

(h) control means for altering the frequency of the oscillator;

(i) switch means for selectively coupling one out of the other output of the oscillator and the said first receiving channel in signal feeding relation to the second input of the mixer means.

7. A method of obtaining coarse and fine indications of a hyperbolic position line passing through the location of a radio receiver using signals at frequencies $n$F and $m$F respectively where $n$ and $m$ are integers differing by unity and said signals are obtained from corresponding radiations from a chain of at least three transmitting stations that, in a cyclic sequence, normally radiate from each station one of a plurality of harmonically related signals and during successive, relatively short interruption periods radiate all said harmonically related signals from one station in turn, said method comprising the steps of:

providing a phase locked signal at frequency $n$F;

dividing said phase locked signal by $n$ and thereby providing a stable reference signal at frequency 1F;

during a period of multifrequency transmission of a preselected station, mixing said phase locked signal at frequency $n$F with said signal at frequency $m$F and thereby obtaining a first output signal at frequency 1F;

obtaining said fine indication by comparing said first output signal in phase with said stable reference signal;

during another period of multifrequency transmission of said preselected station, mixing said signals at $n$F and $m$F and thereby obtaining a second output signal at frequency 1F; and obtaining said coarse indication by comparing said second output signal in phase with said stable reference signal.

8. A method as claimed in claim 7 in which two of said harmonically related frequencies are $n$F and $m$F and are used directly for said phase comparisons.

9. A method as claimed in claim 7 in which two of said harmonically related frequencies are $nf$ and $mf$ where $f$ is different from F, the method further comprising receiving the signals at frequencies $nf$ and $mf$ and changing the frequencies thereof to $n$F and $m$F respectively before utilising them in the phase comparisons.

10. A method of obtaining both coarse and fine indications of a hyperbolic position line passing through the location of a receiver using the transmissions of a chain of radio transmitting stations, said stations having a master station normally radiating a signal at frequency $nf$ and at least two slave stations one of which normally radiates a signal at frequency $mf$, $n$ and $m$ being integers differing by unity, said stations having interruption periods in which at least said signals at frequencies $nf$ and $mf$ are radiated simultaneously from each station in turn, the phase of the signal at frequency $nf$ radiated by the master station being continuous, said method comprising:

receiving the signals at frequnecy $nf$ and $mf$ and obtaining therefrom input signals at frequencies $n$F and $m$F respectively;

locking an oscillator to the input signal at frequency $n$F;

dividing down a signal from the oscillator by $n$ and thereby obtaining a stable reference signal at frequency 1F;

during an interruption period of a selected station, mixing a signal from the oscillator at frequency $n$F with said input signal at frequency $m$F and thereby obtaining a first output signal at frequency 1F;

comparing the first output signal in phase with said stable reference signal and thereby obtaining said fine indication;

during an interruption period of said selected station, mixing said input signals and thereby obtaining a second output signal at frequency 1F; and comparing the second output signal in phase with said stable reference signal and thereby obtaining said coarse indication.

11. A method as set forth in claim 10 in which $f$ equals F.

12. A method as set forth in claim 11 in which $n$ is 6 and $m$ is 5.

13. A method as set forth in claim 10 in which $f$ is different from F, the method further comprising changing the received signals at frequencies $nf$ and $mf$ in frequency to $n$F and $m$F, respectively.

14. A method as set forth in claim 13 in which $n$ is 6 and $m$ is 5.

References Cited

UNITED STATES PATENTS

| | | | |
|---|---|---|---|
| 3,189,903 | 6/1965 | White | 343—105 |
| 3,270,343 | 8/1966 | Bridges | 343—105 |
| 3,348,225 | 10/1967 | Barnard | 343—105 X |

RODNEY D. BENNETT, JR., Primary Examiner

HERBERT C. WAMSLEY, Assistant Examiner